(12) United States Patent
Huang et al.

(10) Patent No.: US 11,423,235 B2
(45) Date of Patent: Aug. 23, 2022

(54) COGNITIVE ORCHESTRATION OF MULTI-TASK DIALOGUE SYSTEM

(71) Applicant: International Business Machines Corporation, Armonk, NY (US)

(72) Inventors: Zi Ming Huang, Beijing (CN); Jie Ma, Beijing (CN); Christopher Jonathan Davis, Boulder, CO (US); Rachel Mohammed, Woburn, MA (US); Zhuoxuan Jiang, Shanghai (CN); Qi Cheng Li, Beijing (CN); Xin Ni, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/678,563

(22) Filed: Nov. 8, 2019

(65) Prior Publication Data
US 2021/0141862 A1    May 13, 2021

(51) Int. Cl.
*G10L 15/22* (2006.01)
*G06F 40/35* (2020.01)
(Continued)

(52) U.S. Cl.
CPC ............ *G06F 40/35* (2020.01); *G06F 40/279* (2020.01); *G06K 9/6257* (2013.01); *G06N 5/043* (2013.01); *H04L 51/02* (2013.01)

(58) Field of Classification Search
CPC ........ G06F 40/35; G06F 40/279; G06F 3/167; G10L 15/22; G10L 2015/223
See application file for complete search history.

(56) References Cited

U.S. PATENT DOCUMENTS

| 8,499,008 | B2 * | 7/2013 | Pennacchiotti | ....... G06F 16/953 707/803 |
| 10,353,906 | B2 * | 7/2019 | Souche | ................. G06F 16/953 |

(Continued)

FOREIGN PATENT DOCUMENTS

| CN | 107357838 A | 11/2017 |
| WO | 2018227815 A1 | 12/2018 |

OTHER PUBLICATIONS

Sushravya GM and Shubhashis Sengupta, "Unsupervised Multi-task Learning Dialogue Management," 2019 Association for Computing Machinery, 7 pages.
(Continued)

*Primary Examiner* — Jakieda R Jackson
(74) *Attorney, Agent, or Firm* — Patterson + Sheridan, LLP

(57) ABSTRACT

In embodiments, a reusable and adaptive multi-task orchestration dialogue system orchestrates a set of single-task dialogue systems to provide multi-scenario dialogue processing. In embodiments, for each question propounded by a user, using a deep learning predictive model, a best single-task dialogue system is chosen out of the set. In embodiments, multi-task orchestration is done without the need to change, or even understand, the inner workings or mechanisms of the individual single-task dialogue systems in the set. Moreover, the multi-task orchestration is also unconcerned with what rules are set in each individual single-task dialogue system. In embodiments, prior to selection of the best single-task dialogue system to return the best answer, new intents and entities are discovered and used to update an existing dialogue path. In embodiments, additional data is continually collected, and used to retrain model so as to further improve performance.

15 Claims, 11 Drawing Sheets

(51) Int. Cl.
*G06N 5/04* (2006.01)
*H04L 51/02* (2022.01)
*G06K 9/62* (2022.01)
*G06F 40/279* (2020.01)

(56) References Cited

U.S. PATENT DOCUMENTS

| | | | |
|---|---|---|---|
| 11,062,700 B1* | 7/2021 | Azi | G06N 5/02 |
| 2013/0091021 A1 | 4/2013 | Maslov et al. | |
| 2013/0174034 A1* | 7/2013 | Brown | G06F 16/951 |
| | | | 715/708 |
| 2014/0114975 A1* | 4/2014 | Rouat | G06F 7/24 |
| | | | 707/737 |
| 2014/0244712 A1* | 8/2014 | Walters | G06Q 10/10 |
| | | | 709/202 |
| 2014/0310002 A1* | 10/2014 | Nitz | G10L 15/1822 |
| | | | 704/270.1 |
| 2015/0185996 A1* | 7/2015 | Brown | G06F 3/167 |
| | | | 715/706 |
| 2016/0071517 A1* | 3/2016 | Beaver | G06F 40/35 |
| | | | 704/9 |
| 2016/0098992 A1* | 4/2016 | Renard | G10L 15/30 |
| | | | 704/275 |
| 2016/0155443 A1* | 6/2016 | Khan | G06F 3/147 |
| | | | 704/275 |
| 2016/0234167 A1* | 8/2016 | Engel | H04L 63/1408 |
| 2017/0140755 A1* | 5/2017 | Andreas | G10L 15/1822 |
| 2017/0310613 A1* | 10/2017 | Lalji | H04L 63/083 |
| 2018/0025726 A1* | 1/2018 | Gatti de Bayser | H04L 51/02 |
| | | | 704/257 |
| 2018/0075335 A1* | 3/2018 | Braz | G06F 16/3329 |
| 2018/0131645 A1* | 5/2018 | Magliozzi | G06F 40/30 |
| 2019/0013019 A1* | 1/2019 | Lawrence | G10L 15/1815 |
| 2019/0073197 A1* | 3/2019 | Collins | G06F 8/60 |
| 2019/0217206 A1* | 7/2019 | Liu | A63F 13/46 |
| 2019/0243899 A1* | 8/2019 | Yi | G06F 16/00 |
| 2019/0258456 A1* | 8/2019 | Byun | G06F 40/35 |
| 2019/0332400 A1* | 10/2019 | Spoor | G06F 3/013 |
| 2020/0137230 A1* | 4/2020 | Spohrer | H04M 3/527 |
| 2020/0153969 A1* | 5/2020 | Dougherty | G10L 17/06 |
| 2020/0287851 A1* | 9/2020 | Anderson | G06F 40/284 |
| 2020/0401848 A1* | 12/2020 | Liu | H04L 67/535 |
| 2021/0004441 A1* | 1/2021 | Sapugay | G06F 40/35 |
| 2021/0042800 A1* | 2/2021 | Chandra | G06N 3/08 |
| 2021/0125025 A1* | 4/2021 | Kuo | G06N 3/04 |
| 2021/0133600 A1* | 5/2021 | Elewitz | G06N 3/08 |

OTHER PUBLICATIONS

David Griol, José Manuel Molina. "A proposal to manage multi-task dialogs in conversational interfaces," ADCAIJ, Regular Issue vol. 5 N.2 (2016), 3 pages.

ibm.com "Watson Assistant | IBM Cloud," [Accessed Online Nov. 7, 2019] https://www.ibm.com/cloud/watson-assistant/.

* cited by examiner

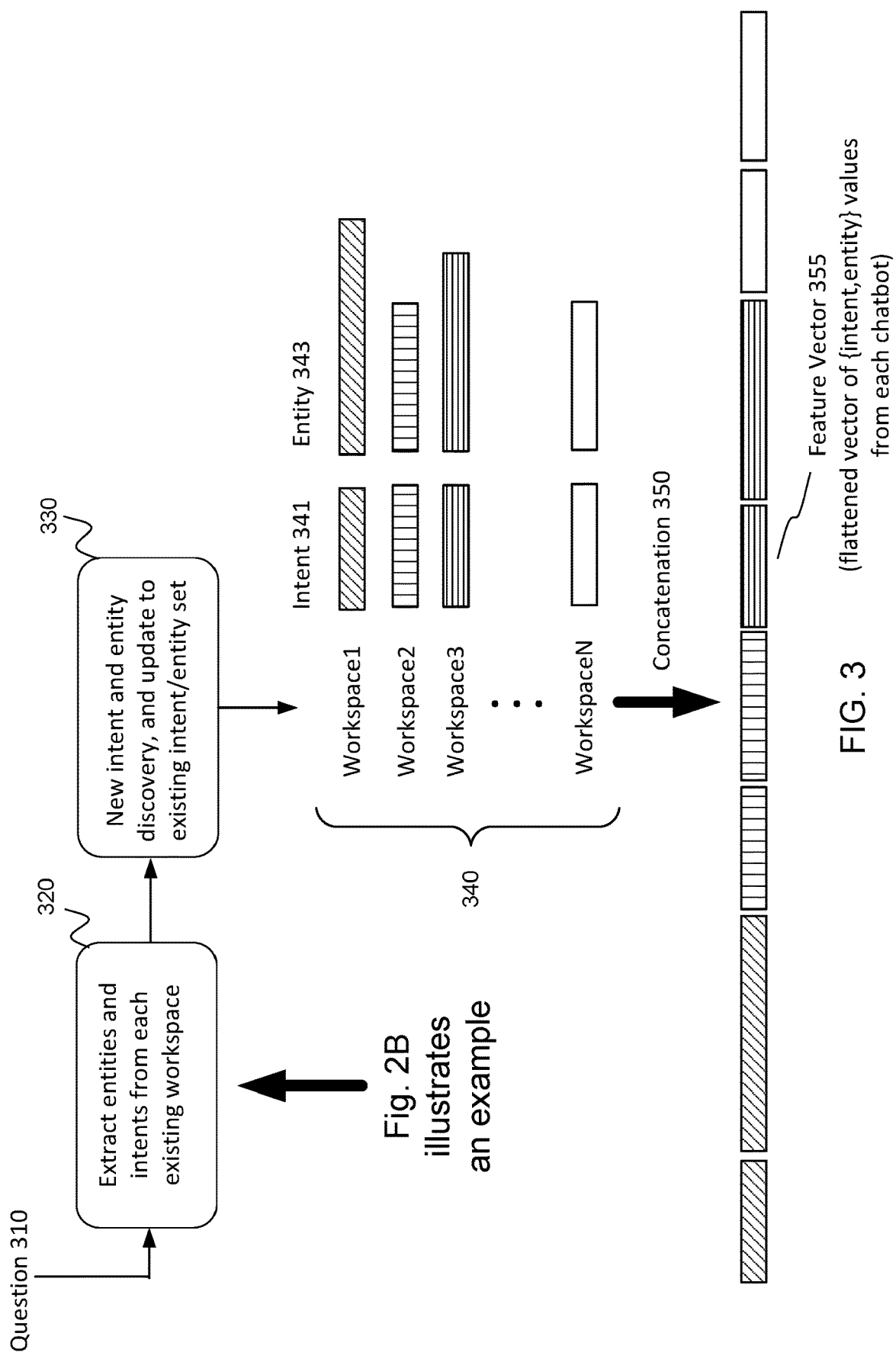

Question: Where do I add new learning?

Predicted Workspace: ⬚ 911    912    903 Start
                                   913

| | Workspace | Weight | Response |
|---|---|---|---|
| 910 | Your Learning | 0.0057 | Are you referring to adding activities or courses to your Learning Queue or creating content for Your Learning? |
| 920 | Your Learning Service Center | 0.939 | I can help you register and share learning activities. The Service Center is designed for people who already have their learning content ready. The content might be a Powerpoint Presentation, a webinar, a video, a document, etc. If your content is ready to share, visit the Create and Share Activity page within Manage Learning Activities and select the Add Learning Activity button. ....<br><br>If your content is on Box, please check out this information on *Registering Box Content*.<br><br>Want some guidance on how to create content? Check out the Service Center Wiki page on how to *Create New Learning*. |
| 930 | Event Central | 0.004 | To invite people to your event and sessions, there are a few ways to go about this, depending upon how aggressive you want to be. It could be as easy a sending the "View Session" link to your audience in an email, or as involved as creating a page with links to tracks, all sessions, or an entire event.<br>Please read this entry called *"Strategies for inviting people to your Events and Sessions"* in the Event Central Community.<br>There are a number of standard calendar invitations you can use for your sessions, or you can create your own. *Go here* to see examples of our standard invitations.<br><br>... |
| 940 | New Seller | 0.0 | Pick out the *Sales Accelerators* that are most applicable to you! You can search for other learning content on *Your Learning*. |

FIG. 9

COGNITIVE ORCHESTRATION OF MULTI-TASK DIALOGUE SYSTEM

BACKGROUND

The present invention relates to cognitive orchestration of a multi-task dialogue system.

Dialogue systems, also known as "chatbots", have becoming increasingly popular, and have attracted more and more attention in the artificial intelligence (AI) world. Conventionally, multi-task dialogue systems include several single-task dialogue systems. Traditionally, a multi-task dialogue system orchestrates a set of single-task dialogue systems, each understanding intents and entities, and then manually sets rules to decide which single-task dialogue system could return the best answer.

However, such traditional multi-task dialogue systems have certain drawbacks. First, prior knowledge of entities and intents obtained from the single-task dialogues is needed in order to better specify orchestration rules. In addition, rule-based orchestration is susceptible to intent and entity update. In other words, when a new intent, or a new intent and entity, are embodied in a user's question to the chatbot, the rule or rules need to change. Finally, manually set rules are difficult to scale.

It is desirable to provide solutions to these drawbacks of conventional multi-task dialogue systems.

SUMMARY

According to one embodiment of the present invention, a method is provided. The method includes receiving a user input to a chat thread of a multi-task dialogue system, transmitting the user input to each chatbot in a set of chatbots, and obtaining, from each chatbot in the set, at least one of an intent data or entity data associated with the user input. The method further includes inputting, for at least a portion of the chatbots, the at least one of intent or entity data to a predictive model, the model configured to select a chatbot of the set likely to have a best response to the user input. The method still further includes receiving a chatbot selection from the predictive model, and outputting a response to the user input using the selected chatbot. According to another embodiment of the present invention, an adaptive dialogue orchestration system is provided. The system includes a user interface, configured to receive a user input to a chat thread of a multi-task dialogue system and transmit it to each chatbot in a set of chatbots, and an adaptive orchestrator, configured to obtain, from each chatbot in the set, an intent and entity associated with the user input, input at least a portion of the intents and entities to a predictive model, the model configured to choose a chatbot of the set likely to have a best response to the user input, and receive a chatbot selection from the predictive model. The adaptive orchestrator is further configured to output, via the user interface, a response to the user input using the selected chatbot.

According to yet another embodiment of the present invention, a computer program product for orchestration of a multi-task dialogue system is provided. The computer program product includes a computer-readable storage medium having computer-readable program code embodied therewith, the computer-readable program code executable by one or more computer processors to receive a user input to a chat thread of a multi-task dialogue system, transmit the user input to each chatbot in a set of chatbots, and obtain, from each chatbot in the set, an intent and entity associated with the user input. The computer-readable program code is further executable by the one or more processors to obtain, from each chatbot in the set, at least one of an intent data or entity data associated with the user input and input, for at least a portion of the chatbots, the at least one of intent or entity data to a predictive model, the model configured to select a chatbot of the set likely to have a best response to the user input. The computer-readable program code is further executable by the one or more processors receive a chatbot selection from the predictive model, and output a response to the user input using the selected chatbot.

BRIEF DESCRIPTION OF THE SEVERAL VIEWS OF THE DRAWINGS

FIG. 3 illustrates adaptive feature extraction, according to one embodiment disclosed herein.

FIG. 9 depicts an example output responding to the user question "Where do I add new learning", according to one embodiment disclosed herein.

DETAILED DESCRIPTION

Figure 1A:
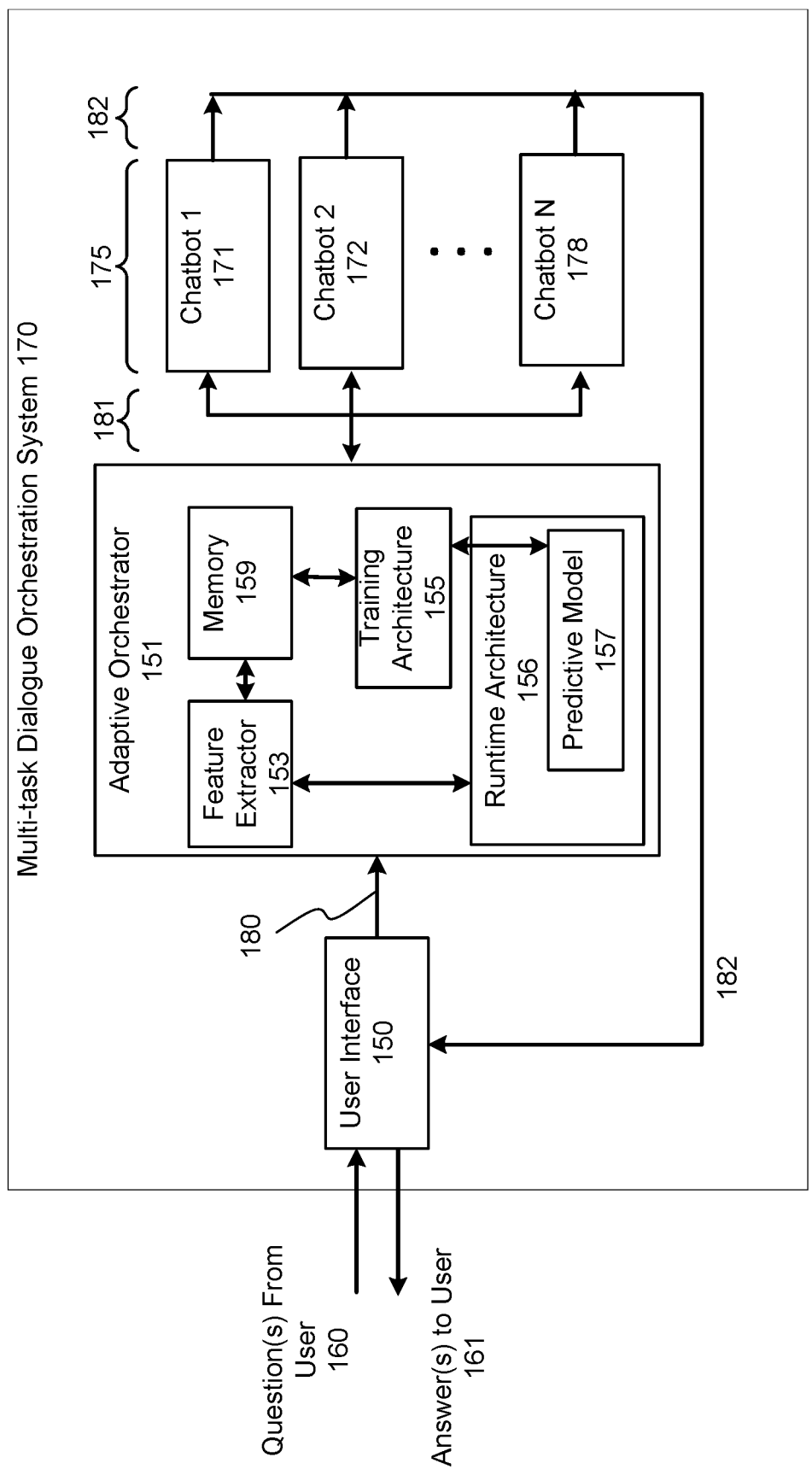
FIG. 1A illustrates a schematic drawing of an example system, according to one embodiment disclosed herein.

Embodiments and examples described herein relate to dialogue systems, known as "chatbots." A chatbot is an automated system that conversationally interacts with users. Chatbots are generally single-task, meaning that they are designed to converse with users about a specific subject domain. For example, a travel oriented website may have a hotel chatbot, a restaurant chatbot, a domestic or local air travel chatbot, and a long distance or international air travel chatbot. Another example, referred to below, and described in detail in connection with FIGS. 2B and 9, refers to a set of four chatbots collectively used by an online sales and education platform. These four chatbots are named "Your Learning", "Your Learning Service Center", "Event Central" and "New Seller", and each is designed to provide information to users of the platform. In particular, each of these four chatbots is designed to answer questions and provide guidance to sellers and other providers of educational content, whether in general, or about the goods and services that they may sell.

However, the natural flow of human conversation (even if the human is only one side of the conversation) is such that questions may jump from topic to topic. Given the way that they are designed, no automated dialogue system can respond to all subjects. Thus, by aggregating a set of chatbots, multiple questions from users may be handled seamlessly. The question is how to orchestrate which chatbot to use to provide a best response to a user at any given point in a conversation. As noted above, traditionally, a multi-task dialogue system orchestrated a set of single-task dialogue systems, each understanding intents and entities, and then manually set rules to decide which single-task dialogue system could return the best answer. However, manually set orchestration rules are hard to scale, require prior knowledge of the semantic content of the questions, and need to be updated when a user question with hitherto unknown semantic content is presented. In embodiments described herein, orchestration of the multi-task dialogue system is automated, the orchestration decided by a trained and updated deep learning predictive model. In such embodiments, the deep learning predictive model finds a best single-task dialogue system at any point in a conversation based on the semantic content of the question.

Thus, in embodiments, a reusable and adaptive multi-task orchestration dialogue system orchestrates multiple single-task dialogue systems to provide multi-scenario dialogue processing. In embodiments, an adaptive orchestration classifier selects a single-task dialogue system from raw chat data. The best single-task dialogue system is chosen based on a deep learning model. In embodiments, the multi-task orchestration is done without the need to change, or even understand, the inner workings or mechanisms of the set of single-task dialogue systems that are used in the multi-task system. Moreover, the multi-task orchestration system is also unconcerned with what rules are set in each individual single-task dialogue system.

In embodiments, an adaptive multi-workspace orchestration discovers new intents and entities to update an existing dialogue path, and then predicts a user response in a given chat thread, and a best single-task dialogue system to return the best answer. The system continually collects additional data, and uses the additional data to retrain a deep learning predictive model so as to further improve performance.

FIG. 1A illustrates a schematic drawing of an example system, according to one embodiment disclosed herein. With reference to FIG. 1A there is shown a multi-task dialogue orchestration system 170. Multi-task dialogue orchestration system 170 includes a set of N chatbots 175, being chatbot 1 171, chatbot 2, 172, and on through chatbot N 178. In embodiments, the inner mechanism of these individual chatbots, also referred to herein as "single-task dialogue systems", is not changed or affected. Moreover, multi-task dialogue orchestration system 170 need not even understand their respective inner workings. In embodiments, multi-task dialogue orchestration system 170 operates on the totality of the set of chatbots 175 to dynamically choose, for any given user question 160, the best answer to return to the user. Thus, in embodiments, during a conversation with a user, multi-task dialogue orchestration system 170 filters and manages all of the outputs of the set of N chatbots to dynamically serve to the user a best response to each query. In embodiments, an ongoing chat with a user may include dozens of questions, for example, as described more fully below.

Continuing with reference to FIG. 1A, multi-task dialogue orchestration system 170 includes a user interface 150, which both receives questions from, and returns responses to a user. On receiving a user question 160, user interface 150 forwards it over communications link 180 to adaptive orchestrator 151. In embodiments, adaptive orchestrator 151 then forwards the question over communications links 181 to each of the chatbots in the set 175, and each chatbot then identifies at least one intent and entity in response to the question, and also outputs one or more corresponding answers in response. As described more fully below, each of chatbots 175 may generate one or more possible answers to a given question, based on multiple identified intents and entities by each chatbot. As also described below, although it is most common to identify both an intent and an entity in a user input, it is sometimes the case, for example with greetings (which are technically not "questions") that open and close a chat, or a portion of a chat, that only an intent is identified. Therefore, when the term <intent, entity>pair is used in this disclosure, it is understood that it may, in actuality, be only one of those conversational attributes. Adaptive orchestration obtains each intent, entity.

After forwarding the user question 160 to the set of chatbots 175, the adaptive orchestrator 151 extracts the identified intent and entity of the question from each of the chatbots in the set of chatbots 175, communicating with the set of chatbots over communications links 181. In one embodiment, this extraction is done by feature extractor 153. It is noted that these two concepts, intent and entity, are used to semantically parse the user input by the chatbots, whether the input is in the form of a question or in the form of a greeting, as described more fully below with reference to FIG. 2B. Given the respective extracted intents and entities from the set of chatbots, adaptive orchestrator 151 combines them into a feature, which includes all of the collective knowledge of the set of chatbots regarding the user's proffered input. In one embodiment, the feature may be a vector of one dimension, which includes each of the <intent, entity> pairs of each of the chatbots 175 concatenated together. In one embodiment, the feature is stored in memory 159. In one embodiment, the adaptive orchestrator 151 then chooses one of the chatbots to provide the answer to the user by applying a predictive model 157 to the feature, which is, in embodiments, the input to the predictive model 157. As shown, predictive model 157 is part of runtime architecture 156 of the adaptive orchestrator 151.

Continuing with reference to FIG. 1A, once adaptive orchestrator chooses a best chatbot to respond to the user question, the selected chatbot then outputs the corresponding answer to this query, sending it to user interface 150 over communications links 182. It is noted that only one chatbot will send an answer to user interface 150, being the chatbot selected by runtime architecture 156, of adaptive orchestrator 151, as described above. As also noted above, each of chatbots 175 may generate multiple answers to any question. Which answer is selected to return to the user is decided by the existing chatbot capability, and, in embodiments, is not micromanaged by adaptive orchestrator 151. As to how each chatbot may extract intent and entity, in embodiments, the Watson Assistant API (offered by IBM® of Armonk, N.Y.) may be leveraged. Specifically, given some predefined intents with corresponding examples, for each utterance to call the API, it obtains an intent list with corresponding confidence values ranking from large to small.

It is noted that while in some embodiments the set of chatbots 175 may be co-located with the other elements of multi-task dialogue orchestration system 170, such as, for example, on a single computing node, in general this is not necessary. Thus, in alternate embodiments the set of chatbots may be located in the cloud, or on a different computing node than the node where user interface 150 and adaptive orchestrator 151 are provided. In this alternate embodiment, communications links 181 and 182 are over a data communications network, as opposed to being local connections. In this connection it is reiterated that, in embodiments, the function, operation or design of individual chatbots is not changed, rather, their collective outputs are orchestrated by adaptive orchestrator such that one single answer, the one judged by adaptive orchestrator 151 as the best one, is returned to the user in response to any user input. As a result, the adaptive orchestrator 151 may, in some embodiments, simply receive the outputs of the set of chatbots 175 from any remote location, over any communications link, and orchestrate them. The only limit being a maximum network delay so that the user need not perceive an unacceptable lag time between entering his or her question and receiving an answer from the dialogue system.

As noted above, adaptive orchestrator 151 includes feature extractor 153, which combines an intent and entity identified by each chatbot for each question propounded by a user into a single vector that contains all of the <intent, entity> pairs of all of chatbots 1 through N 175. It is here noted that, in embodiments, a chatbot operates by parsing a user question to discern the intent behind the question, and the entity to which that intent refers. For example, a hotel booking chatbot may receive the following user query: "what hotels are available tonight in Chicago?" The intent is "find available tonight" and the entity is "hotel room in Chicago." Because the various chatbots in the set of N chatbots 175 have different purposes, for example, each is designed to converse in a specific knowledge domain, they may each respectively have different internal mechanisms. Thus, each respective chatbot of the set of chatbots may parse a user question differently, and thus each chatbot 175 may identify a different <intent, entity> attribute pair for the same question. All of these attribute pairs are accessible by adaptive orchestrator 151 via links 181, and it is feature extractor 153 that concatenates all of the <intent, entity> pairs into a feature vector. This is described more fully below with reference to FIGS. 3 and 4.

Continuing further with reference to FIG. 1A, adaptive orchestrator also includes two architectures, a training architecture 155, and a runtime architecture 156. Training architecture 155 includes a predictive model trainer that trains a deep learning predictive model 157 to select a single chatbot's as the best one to respond to a user's question. Runtime architecture 156 then uses the trained predictive model 157 to select a given singe-task chatbot in real time in response to a user question. Because adaptive orchestrator selects a best single chatbot of the set of chatbots 175 to respond to each user question, and because a given conversation with a user may include several, or several tens of, questions, in embodiments, adaptive orchestrator may jump from chatbot to chatbot as a conversation unfolds. Adaptive orchestrator's decision is then provided to user interface 150 over communications link 182, which then outputs the response as an answer to user 161, thus completing the query-response loop.

Thus, in such embodiments, the respective answers generated by each chatbot provide possible responses which may be chosen. Adaptive orchestrator then selects a best response from all of these possible responses, using continually updated predictive model 157, thereby providing a significant advance over conventional manually created rule based systems.

Figure 1B:
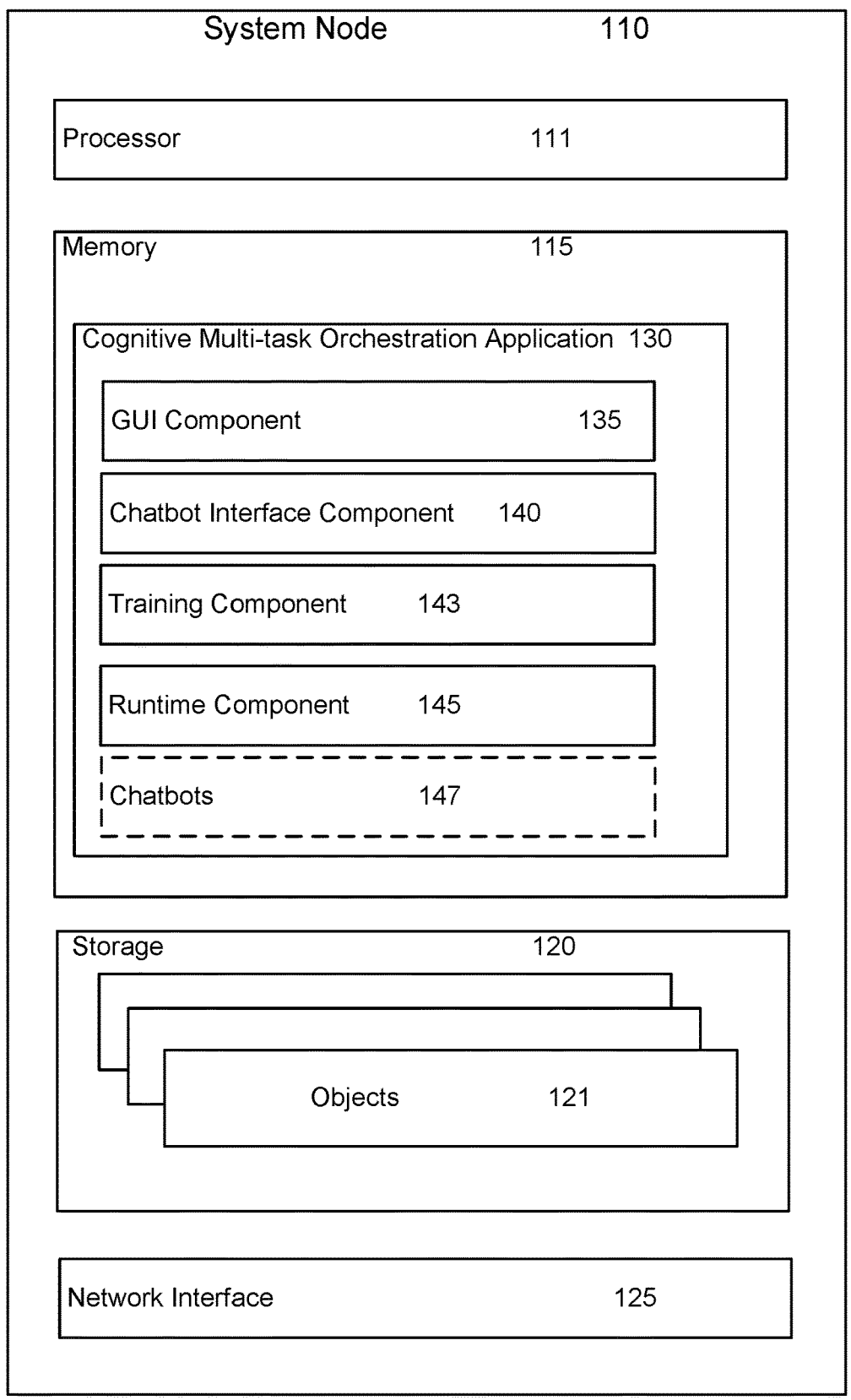
FIG. 1B is a block diagram illustrating a system node configured to provide cognitive multi-task orchestration of dialogues, according to one embodiment disclosed herein.

FIG. 1B is a block diagram illustrating a System Node 110 configured to provide cognitive multi-task orchestration of dialogues, according to one embodiment disclosed herein. System Node 110 is equivalent to the multi-task dialogue orchestration system 170 schematically depicted in FIG. 1A, but without showing in FIG. 1B all of the individual chatbots 171 through 178, and all of the internal (or external) communications pathways that are shown in FIG. 1A. As noted above, the set of single-task chatbots may, in embodiments, be remote to System Node 110, and thus need not be provided at the System Node 110. In the illustrated embodiment, the System Node 110 includes a Processor 111, Memory 115, Storage 120, and a Network Interface 125. In the illustrated embodiment, the Processor 111 retrieves and executes programming instructions stored in Memory 115, as well as stores and retrieves application data residing in Storage 120. The Processor 111 is generally representative of a single CPU, multiple CPUs, a single CPU having multiple processing cores, and the like. The Memory 115 is generally included to be representative of a random access memory. Storage 120 may be disk drives or flash-based storage devices, and may include fixed and/or removable storage devices, such as fixed disk drives, removable memory cards, or optical storage, network attached storage (NAS), or storage area network (SAN). Storage 120 may include one or more data bases, including IASPs. Via the Network Interface 125, the System Node 110 can be communicatively coupled with one or more other devices and components, such as other System Nodes 110, monitoring nodes, storage nodes, and the like.

In the illustrated embodiment, the Storage 120 includes a set of Objects 121. Although depicted as residing in Storage 120, in embodiments, the Objects 121 may reside in any suitable location. In embodiments, the Objects 121 are generally representative of any data (e.g., application data, saved files, databases, and the like) that is maintained and/or operated on by the System Node 110. Objects 121 may include a set of features previously generated by a feature extractor of runtime component 145 in response to user questions previously processed by system node 110. Objects 121 may also include one or more deep learning based predictive models, embodied as, for example, one or more artificial neural networks (ANNs), one or more convolutional neural networks (CNNs), or the like, which are trained to, and then used to, select a best single-task dialogue system (e.g., one of Chatbots 147) to respond to a given question proffered by a user to the multi-task dialogue system. Objects 121 may still further include a set of raw data, comprising <question, chatbot weight> pairs which Training Component 143 uses to train the one or more deep learning models described above. As illustrated, the Memory 115 includes a Cognitive Multi-Task Orchestration Application 130. Although depicted as software in Memory 115, in embodiments, the functionality of the Cognitive Multi-Task Orchestration Application 130 can be implemented in any location using hardware, software, firmware, or a combination of hardware, software and firmware. Although not illustrated, the Memory 115 may include any number of other applications used to create and modify the Objects 121 and perform system tasks on the System Node 110.

As illustrated, the Cognitive Multi-Task Orchestration Application 130 includes a GUI Component 135, a Chatbot Interface Component 140, a Training Component 143 and a Runtime Component 145. It also optionally includes Chatbots 147, as noted above. Although depicted as discrete components for conceptual clarity, in embodiments, the operations and functionality of the GUI Component 135, the Chatbot Interface Component 140, the Training Component 143, the Runtime Component 145, and the Chatbots 147, if implemented in the System Node 110, may be combined, wholly or partially, or distributed across any number of components. In an embodiment, the Cognitive Multi-Task Orchestration Application 130 is generally used to manage or orchestrate the provision of a response to a user query to a virtual assistant, an automated dialogue system, or the like, by selecting a best one of a set of chatbots, predicted by runtime component 145, to provide an answer to the user input. In an embodiment, the Cognitive Multi-Task Orchestration Application 130 is also used to train, via the Training Component 143, the one or more deep learning predictive models that select, in real time, a best chatbot to answer a user's question from all of the possible Chatbots 147 that comprise the multi-task dialogue system.

In an embodiment, the GUI Component 135 is used to generate and output graphical user interfaces (GUIs) for users, as well as to receive input from users. In one embodiment, users can use the GUI Component 135 to chat with the Cognitive Multi-Task Orchestration Application 130, including to input questions to it and to receive answers to those questions from it, such as, for example, in one or more online conversations. Thus, in some embodiments, the displayed GUI includes an entire conversation between the user and an example multi-task dialogue system, and in others it may only display a predefined recent portion of the conversation.

In the illustrated embodiment, the Chatbot Interface Component 140 receives information from the GUI Component 135 (e.g., input by a user), and passes that information to the Chatbots 147. In the illustrated embodiment, Runtime Component 145, in response to intents and entities generated by chatbots 147 in response to the user input or question, selects a best chatbot to answer the question using a deep learning predictive model. An example of the runtime operation of Cognitive Multi-Task Orchestration Application 130 is described in more detail below in connection with FIGS. 7 and 8. In embodiments, the deep learning predictive model may be trained by the Training Component 143 of Cognitive Multi-Task Orchestration Application 130, based on, for example, a set of data stored as Objects 121 in Storage 120.

Moreover, in embodiments, the deep learning predictive model may undergo ongoing training as new questions are received from users, which have not been previously submitted. In such cases the Runtime Component will identify new <intent, entity> pairs, and the deep learning predictive model may be recalibrated to select the individual chatbot with the best answer to this new question. When new <intent, entity> pairs are discovered, the length of the whole feature changes in a corresponding way. In embodiments, predictive model 157 can automatically change input dimensions, and, as a result, the model can retrain itself when the discovery of new <intent, entity> pairs occurs.

In embodiments, System Node 110 may communicate with both users as well as other computing nodes, such as, for example, other computing nodes located in the cloud, or at remote locations, via Network Interface 125.

As noted above, in one or more embodiments, a reusable and adaptive multi-task orchestration dialogue system is implemented. The multi-task dialogue system orchestrates multiple single-task dialogue systems to provide multi-scenario dialogue processing. In some embodiments, this is effected by an adaptive orchestration rule classifier that selects a single-task dialogue system from raw chat data. The best single-task dialogue system is chosen based on a deep learning model.

Thus, in embodiments, dialogue systems or chatbots may operate by extracting an intent and entity from a user proffered question. For example, a user may ask an online chatbot that appears at a travel website "how much is a hotel room in Rome, Italy in August? Using an intent/entity parser, the chatbot may extract "find a price" as the intent, and "hotel in Rome in August" as the entity. Based on the extracted intent and entity the chatbot, now knowing what the user is looking for, generates one or more possible responses. Thus, in the description below, it is assumed that each single-task chatbot or workspace extracts entities and intents from each user question it receives. Moreover, in embodiments, new intents and entities are also extracted to update an existing dialogue path, as described in detail below, in connection with FIGS. 7 and 8.

Figure 2A:
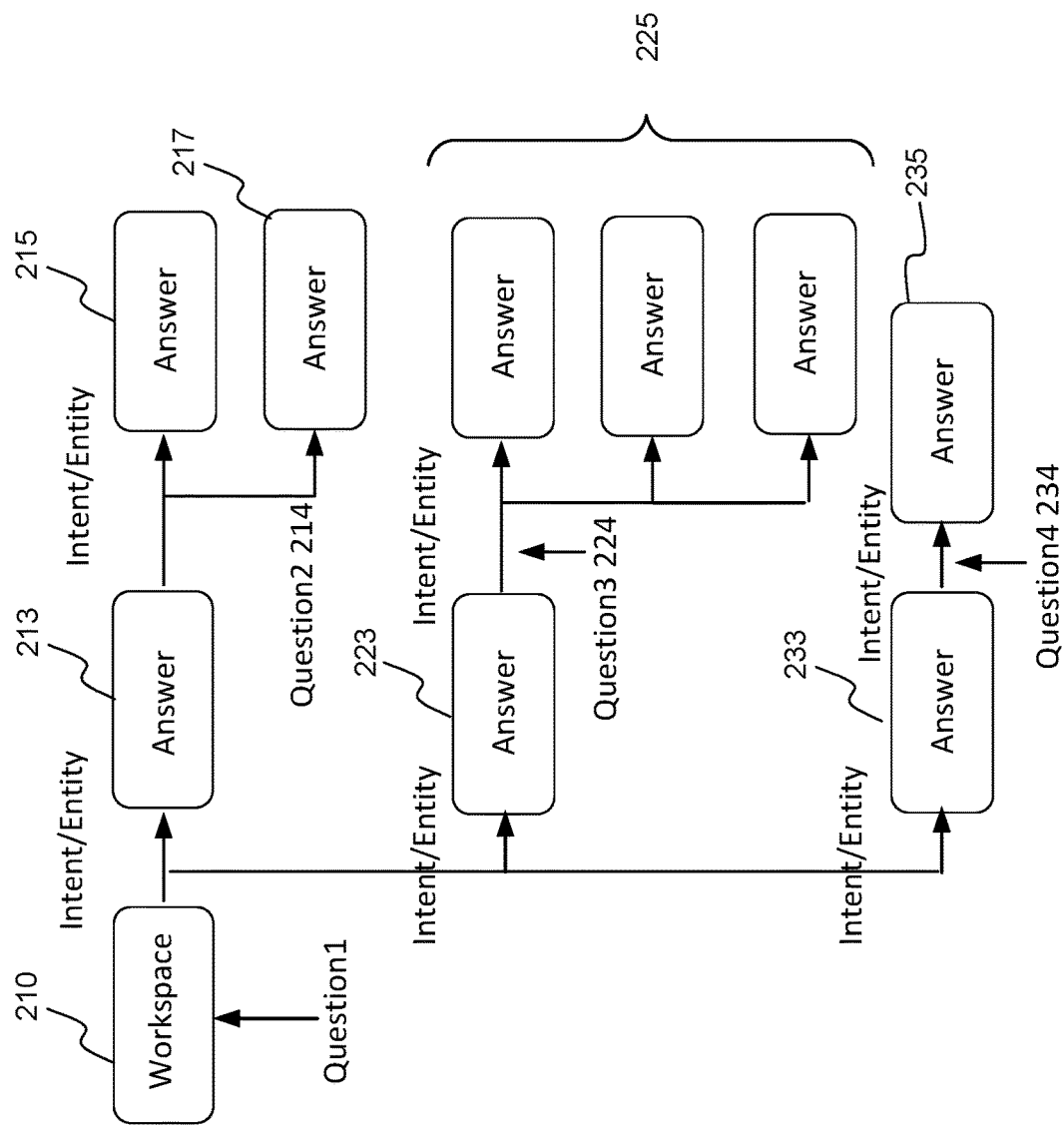
FIG. 2A illustrates an example chat bot conversation path based on parsing an intent and an entity in a conversation tree to answer a question received from a user, according to one embodiment disclosed herein.
Figure 2B:
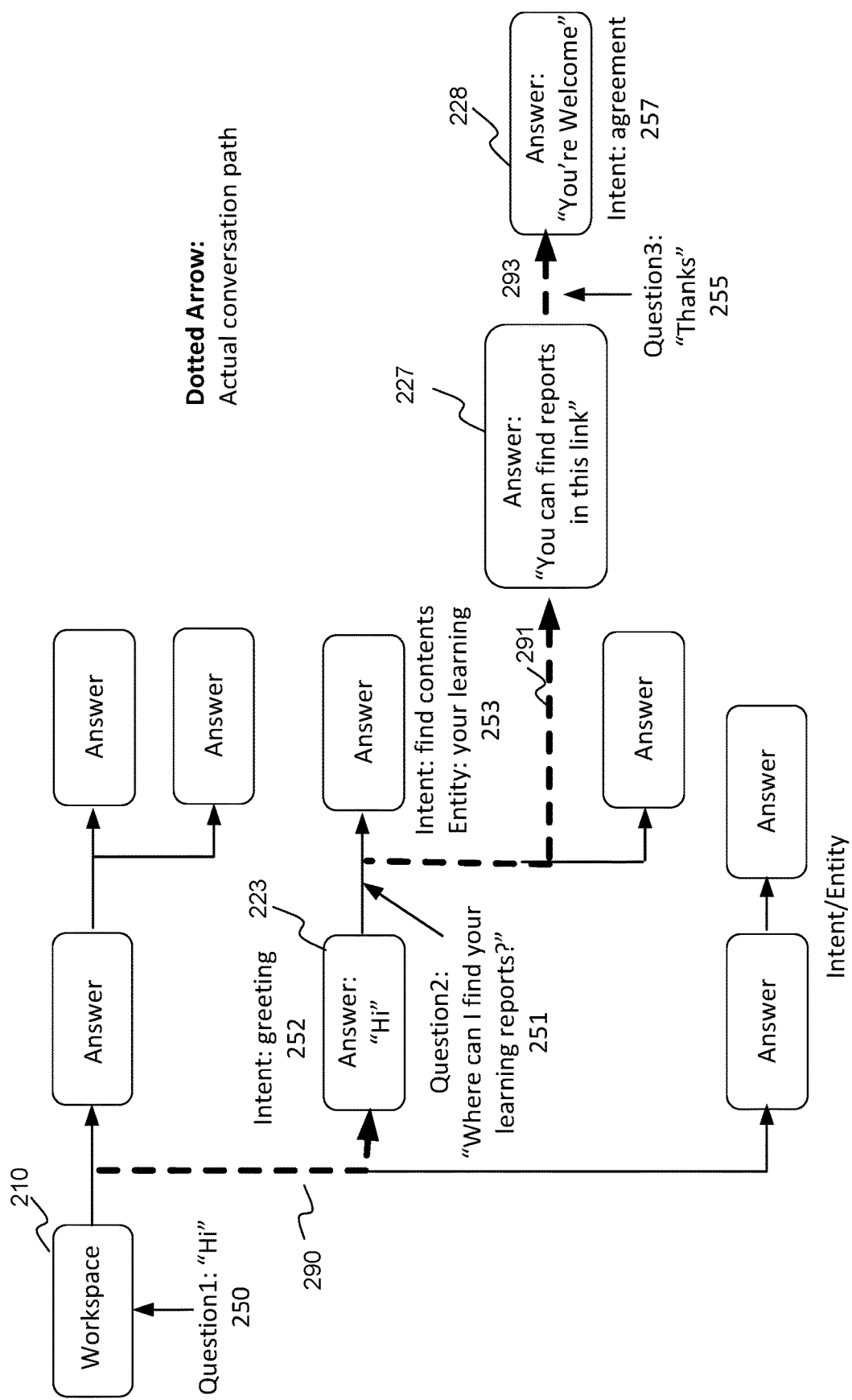
FIG. 2B illustrates an instantiation of the example chat bot conversation path of FIG. 2A interacting with a series of example questions from a user, according to one embodiment disclosed herein.

FIGS. 2A and 2B, next described, illustrate the framework and process at an individual chatbot, according to one embodiment. It is here noted that, although the examples described herein relate to intents and entities parsed by a chatbot from each user input, it is not necessary that the question be parsed in this manner. In alternate embodiments, any semantic parsing of the user input may be used to train the predictive model, such as, for example, topic or other semantic attributes.

FIG. 2A illustrates an example chatbot conversation path based on parsing an intent and an entity in a conversation tree to answer a question received from a user, according to one embodiment disclosed herein. With reference thereto, it is noted that interactions are shown for only one chatbot. It is noted that as used herein, the term "workspace" refers to a chatbot. The example conversation snippet begins with a first question, labeled as "Question1." To this first question there are three possible answers generated by the example workspace, shown as answers 213, 223 and 233. Each possible answer is in response to an intent/entity pair extracted by the workspace from Question 1. For example, a user may first ask "I have a technical problem." To this first user input, there is generally only one intent, entity pair (or only one other set of semantic categories, if the chatbot does not parse intents and entities). Thus, the chatbot may answer: "Which technical problem do you need assistance with?" If the user has three possible technical problems, the chatbot will generate three possible answers. Once the user answers this, for example, by saying "Part A" the system then detects that the entity is equal to "Part A" and then go to the "Part A" branch to output the corresponding answer. If, however, the intent and entity are the same then there is only one answer. Thus, as shown, there are three possible paths the conversation may take, depending upon whether a first answer 213, 223 or 233 is provided to the user. In response to each of these first answers, there are shown three respective follow-up questions received from a user. These are shown as Question2 214, Question3 224 and Question4 234. In response to each of these example follow-up questions, each conversation path provides one or more answers. These are answers 216 and 217 to Question2, the three answers 225 to Question3, and answer 235 to Question4. In embodiments, an actual conversation path may be selected, in response to each user question, by an adaptive orchestrator, such as, for example, adaptive orchestrator 151 of FIG. 1, described above, if the illustrated workspace is chosen by that adaptive orchestrator from a set of multiple workspaces, for example chatbots 1 through N of FIG. 1, from which it receives inputs.

FIG. 2B illustrates an instantiation of the example chatbot conversation format of FIG. 2A interacting with a series of example questions from a user, according to one embodiment disclosed herein. The example chatbot of FIG. 2B is one of several associated with a website or platform that services users who provide and consume online learning materials. With reference to FIG. 2B, a first question, Question1 250 is simply a greeting "Hi." In embodiments, a user input may most often be a question, but user input may also include greetings or statements. In response to the user Question1 (actually a greeting), there are three possible conversation paths. FIG. 2B illustrates the conversation path 290 actually chosen for this example, illustrated by the thick dashed arrow. In embodiments, the actual conversation path reflects a choice made by the chatbot at each set of possible responses, of one single response that it serves back to the user. It is noted that each path in FIG. 2B has a different intent and entity to indicate a different answer or action. When the current intent and entity equal the intent and entity on the path, then the system chooses that path to move on. Thus, even in one node there may exist many different answers or actions, but they can be identified by different intent and entity settings. As noted with reference to FIG. 2A, the chatbot extracts the intent and entity of each user input. In the case of "Hi", which is a common greeting, there is no entity to be extracted, rather just an intent, namely "greeting" as shown at 252. In response, at 223, the chatbot responds "Hi." At this point in the conversation the user inputs another question, Question2 at 251, namely "Where can I find your learning reports?" The chatbot parses this question to extract its intent and entity, as shown at 253. The intent here extracted is "find contents" and the entity, i.e., the contents object sought, is parsed as "your learning."

Continuing with reference to FIG. 2B, in response to Quesiton2 251, there are three possible answers. One of them, at 227, is chosen, and thus the actual conversation path at this point is shown by arrow 291. The answer provided is "You can find reports in this link." Upon providing answer 227 to the user, the user then provides a final input, Question3 at 255, which simply says "Thanks." This user question (the term "question" includes all chatbot user input for the purposes of this disclosure) is also parsed, at 257. Given that Question3 is an assent to the prior answer, only an intent is found at 257, namely "agreement." In response, the example chatbot generates only one possible answer, at 228 "You're Welcome", which ends the conversation.

FIG. 3 illustrates adaptive feature extraction, according to one embodiment disclosed herein. As shown in FIGS. 2A and 2B, described above, an individual chatbot first parses the intent and entity of each user provided question (again, the term "question" is in the broadest sense), and, in response to the values of those attributes, generates one or more responses. In embodiments, this process occurs for each chatbot in a set of chatbots that are used in the multi-task dialogue system, and then these results are extracted by an overseeing multi-task dialogue orchestration system, and processed for further use. In embodiments, this processing may be performed, for example, by feature extractor 153 shown in FIG. 1. This processing is illustrated in FIG. 3. With reference thereto, a user question is received at 310, shown in the top left of the figure. Question 310 is then processed at block 320 at each individual workspace (chatbot) to extract the intents and entities. One example of such parsing of intent and entity values of several user questions is illustrated in FIG. 2B, described above. As noted above, the intent and entity values parsed by individual workspaces of a set of workspaces, for the same user input or question, are generally not the same. This is a function of the knowledge domain the individual chatbot is designed to converse in. Also occurring at block 320 is the extraction of the intents and entities from each existing workspace.

Continuing with reference to FIG. 3, from block 320, processing moves to block 330, where any new intent and entity values discovered in the entities and intents extracted from the set of chatbots at block 320 are used to update a master intent/entity set used by the system. As noted above, different chatbots have different intent and entity sets. In embodiments, each intent and entity is combined together, including multiple intent, entity pairs from each chatbot (this is not shown in FIG. 3, for simplicity, but, where it occurs, a given workspace will have more than one <intent, entity> pair contribution to feature vector 355), to generate a feature vector. The feature vector is then used to train a model, for example, predictive model 157, to classify. When a new intent/entity pair is discovered, this changes the input to the predictive model, and the model input dimension will also correspondingly change. Thus, the new intent and entity not only change the input dimension of the model, but also updates the existing dialogue path.

Continuing with reference to FIG. 3, as shown at 340, the set of intents and entities obtained from each of the chatbots in the set of chatbots (including multiple intents and entities from a single chatbot) is concatenated into a feature vector 355. Thus, for example, the intent 341, and the entity 343, from Workspace1, indicated by the diagonal line shading in FIG. 3, is concatenated with the intent 341, and the entity 343, from Workspace2, indicated by the vertical line shading, the intent 341, and the entity 343, from Workspace3, indicated by the horizontal line shading, and continuing on to include, finally, the intent 341, and the entity 343, from WorkspaceN, indicated by no shading. The interim workspaces between Workspace 3 and WorkspaceN not being shown in FIG. 3, for conciseness. It is feature vector 355, comprising all of the intents and entities, from all of the worskspaces 1 though N, that is the input to the predictive model. In embodiments, based on all of the intent and entity data for each of the Workspaces 1 through N (and not some a prior human set rules), the predictive model then selects one of the workspaces as providing the best answer to the user's input, whether a question or a greeting, or the like. It is here noted that, as illustrated in the examples of FIG. 2B, sometimes, such as, for example, when the user input is not strictly a question, there is no entity, just an intent. For those user inputs, obviously, the feature vector for that question will generally only include a concatenated series of intents.

Figure 4:
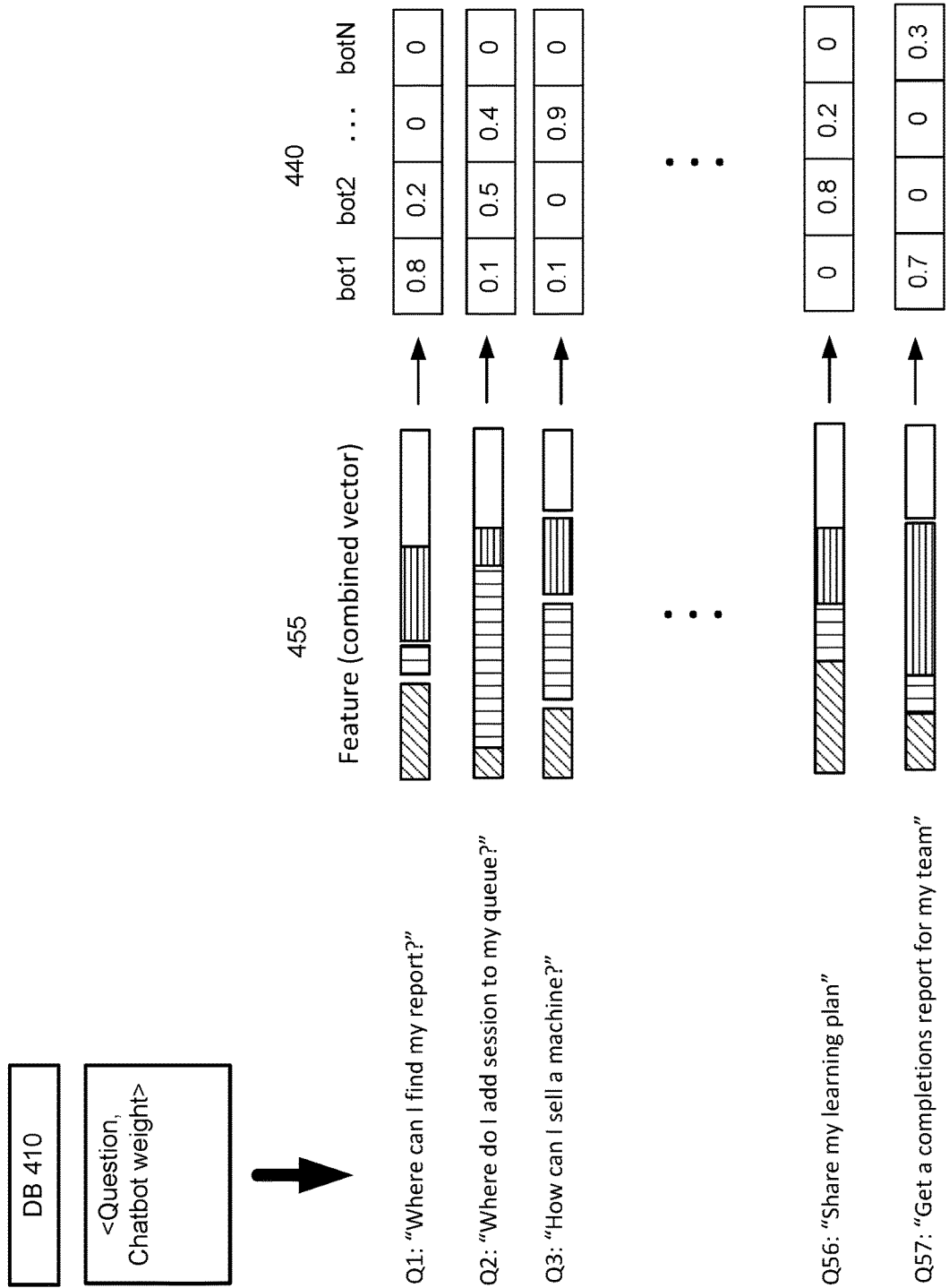
FIG. 4 illustrates pre-processing of raw data, according to one embodiment disclosed herein.

FIG. 4 illustrates aspects of training the predictive model used to select the best single-task dialogue system (chatbot). FIG. 4 illustrates pre-processing of raw data, according to one embodiment disclosed herein. The raw data illustrated is one example of a training set used to train the predictive model. As shown, database 410 stores a series of questions and corresponding chatbot weights, as <question, chatbot weight>pairs. In one embodiment, database 410 is stored in memory 159 of adaptive orchestrator 151, of FIG. 1A. Or, for example, database 410 is included in objects 12 stored in storage 120, of example system node 110 of FIG. 1B. Database 410 also stores the existing features 455, and when a new question is received, an example system extracts new feature 455 and then also stores it in 410. In embodiments, additional chatbots may also be added at any point in time to the set of chatbots orchestrated by the adaptive orchestration system. When that occurs, the dimension of the feature vectors also increases, as to a given user input, by the number of <intent, entity>pairs that new chatbot generates for any given user question. Thus, in embodiments, an adaptive orchestration system may continually retrain itself as new questions are received, and new features generated in response to those new questions, and new chatbots are added to the set of chatbots that are available to the adaptive orchestrator for potential selection. In embodiments, this ability to continually retrain increases the accuracy of a predictive model to select the best single chatbot to respond. In embodiments, the predictive model may be trained periodically, depending upon demand. For example, the model may be retrained weekly. However, when a new chatbot (workspace) is added, the predictive model needs to be trained immediately.

Continuing with reference to FIG. 4, as shown, the raw data includes 57 example questions, of which, as examples, questions 1-3 and 56-57 are shown. In addition to the set of questions, there is also a chatbot weight assigned to each chatbot in the set of chatbots comprising the multi-task dialogue system. These weights may initially be assigned to the various questions, by humans, based on knowledge of which chatbot is best designed to answer each question. However, the training of the predictive model involves performing feature extraction on the raw data, as shown at 455, to obtain a feature vector for each question, using the process illustrated in FIG. 3, described above. This adds to the <question, chatbot weight> data a feature vector for each question. Because the system already knows the chatbot weights 440 for the set of chatbots 1 though N used in the multi-task dialogue system, to train the predictive model, the feature vectors can now be correlated to the chatbot weights 440, to find out inherently which features, e.g., <intent, entity> match the best chatbot weighting score. In this way the predictive model may be trained to output its own set of chatbot weights as a function of feature vectors as inputs.

Figure 5:
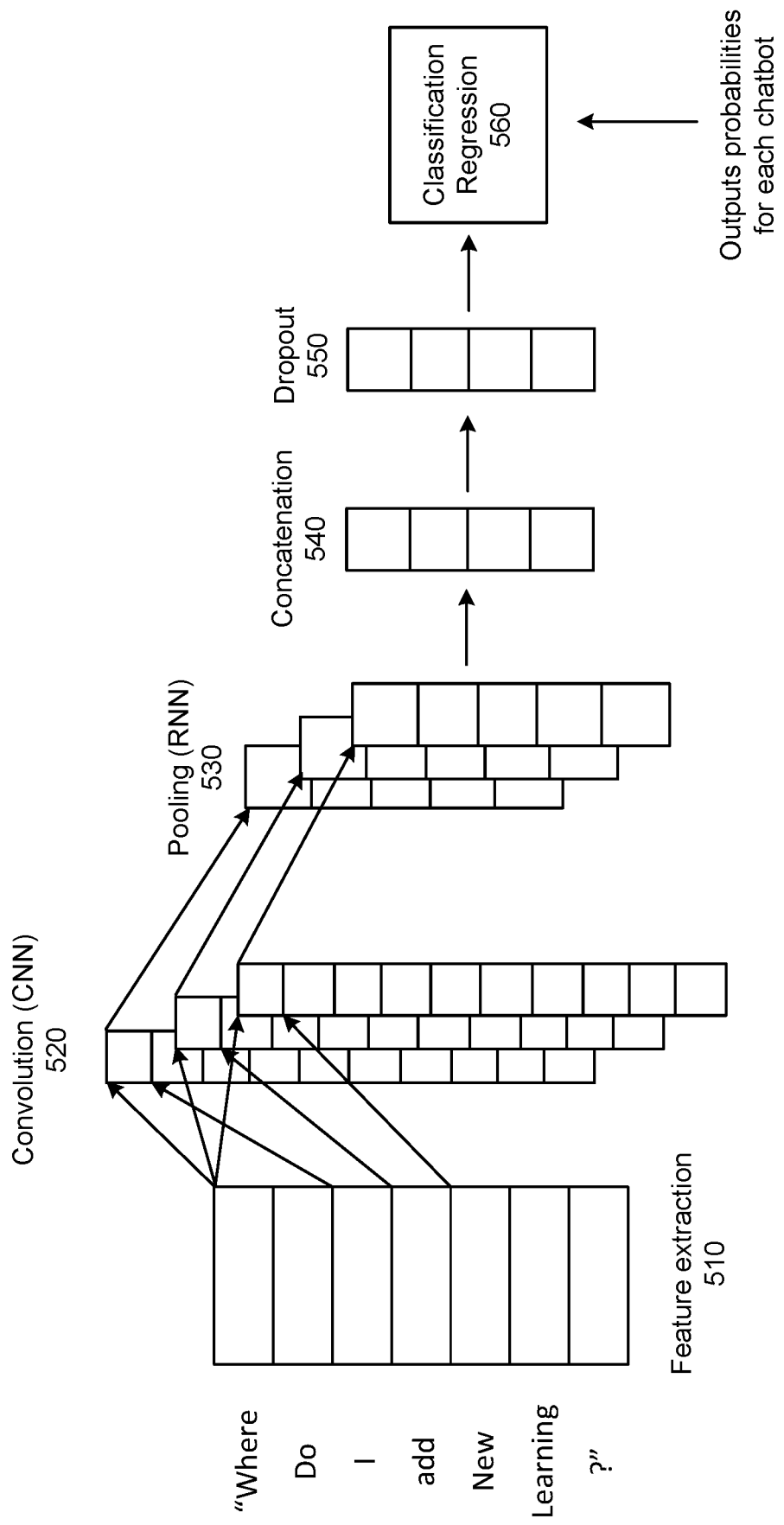
FIG. 5 illustrates an example implementation of machine learning to orchestration of multiple chatbots, according to one embodiment disclosed herein.

FIG. 5 illustrates an example implementation of machine learning to orchestration of multiple chatbots, according to one embodiment disclosed herein. Thus, FIG. 5 illustrates the process of The end product is a set of probabilities With reference to FIG. 5, there is shown an example user input question "Where do I add new learning?" The question is parsed at 510, where the multi-task orchestration application extracts features to create a feature vector, as described above. Once the feature vector is generated, there are several processing stages, as shown. These include a convolution stage 520, which may be performed, for example, by a convolutional neural network (CNN). Stage 520 is followed by a pooling stage 530, which may be performed, for example, by a recurrent neural network (RNN). Following the pooling stage 530, there may be a concatenation stage 540, followed by a dropout stage 550, and then, finally, classification and regression 560. The final output of classification regression 560 is a set of weightings, or probabilities, used to select the best chatbot to respond to the question. It is noted that FIG. 9 shows an example output for the question "Where do I add new learning?" of FIG. 5, using a four chatbot multi-task dialogue system. This is discussed in greater detail below, in connection with FIG. 9.

It is noted that the operations shown in each of stages 520 through 560 are common operations in CNN models. For example, in embodiments, stage 520 may use three different filter maps to filter the input vector, stage 530 may use a max-pooling operation to filter the three vectors of stage 520, and stage 540 combines the three different vectors into one vector. Further, stage 550 is a dropout operation, where dropout is a technique for addressing the overfitting problem. The idea is to randomly drop units in a deep neural network. 560 is a common classification operation which chooses a largest value in all dimensions of the vector.

Figure 6:
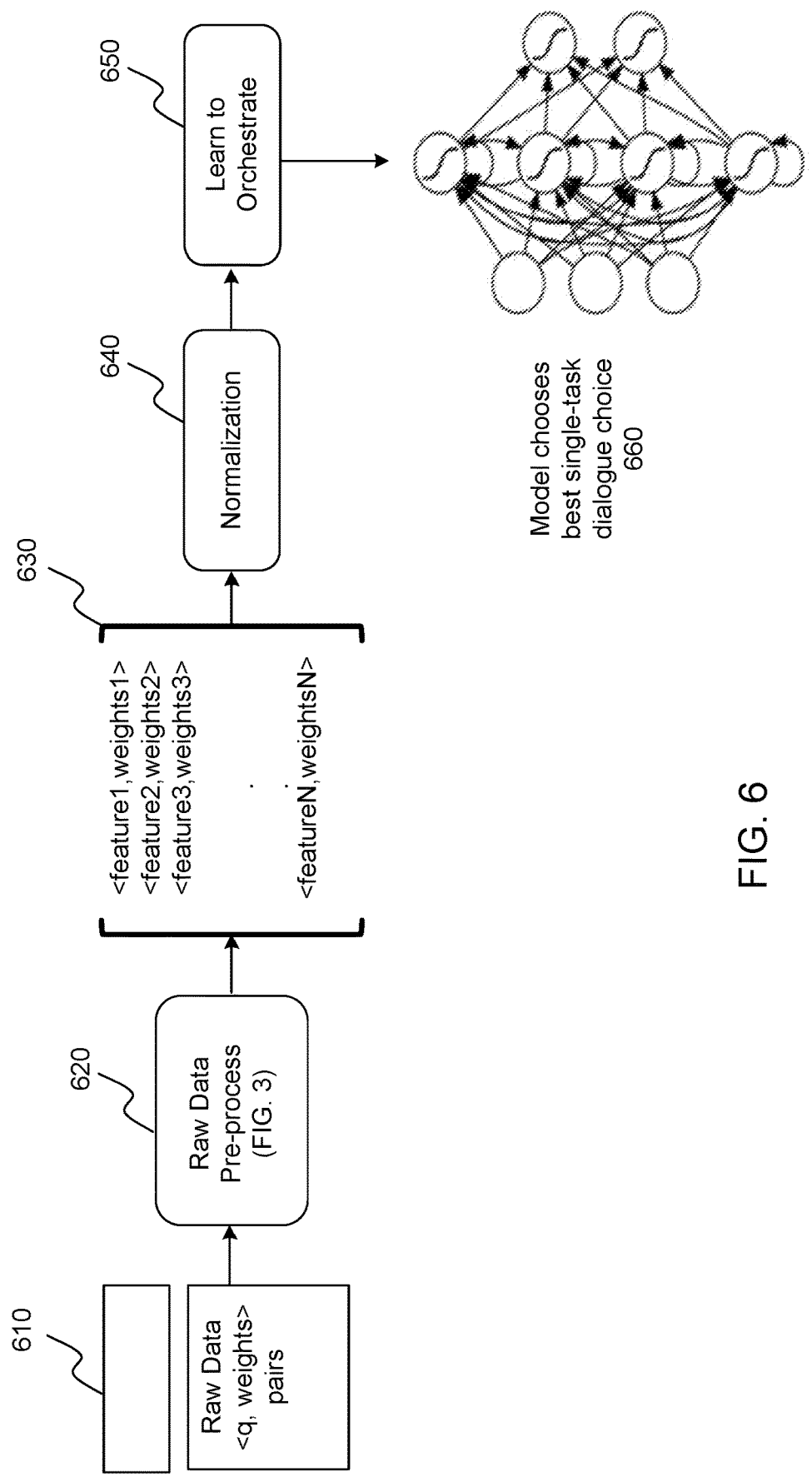
FIG. 6 depicts process flow of an example training process, according to one embodiment disclosed herein.

FIG. 6 depicts an example process flow for training the deep learning predictive model used in the orchestration of multiple chatbots, according to one embodiment disclosed herein. With reference thereto, raw data for training the predictive model is stored in a database 610. As described above with reference to FIG. 4, the raw data includes a set of N questions and corresponding chatbot weights, as <question, chatbot weight> pairs. A weight for a chatbot may be understood as a probability score for that chatbot that indicates how likely that chatbot is to provide the best answer to the user input to the dialogue system. The chatbot weights for each question correspond to a set of M chatbots used to train the predictive model, and this, for each question, there are M separate weights. The raw data is then pre-processed, at block 620, in the manner illustrated in FIG. 4 and described above. As described above, this pre-processing extracts the <intent, equity> attributes for each question, resulting in a feature vector for each of the N questions. Combining the feature vector for each question with the chatbot weights for that question from the raw data in database 610, results in the set of <feature, weights> pairs shown at 630, which is the result of the pre-processing. These results are then normalized, as shown at 640, so that the chatbot weights all add up to a pre-defined number, such as, for example, 1.0. Thus, the relative weights of all of weights1 through weightsN are not the same scale, and directly comparable with each other. In embodiments, for normalization, all of the weights in the feature, weights pairs 630 are normalized to make the sum of all weights equal to 1 in order to train a better network. The normalized data is then processed at 650, as is shown in FIG. 5, so as to cause the predictive model to learn, from this data, how to orchestrate the multiple chatbots to best respond to a user question. Once the model has learned to orchestrate at block 650, it is trained, and can choose a best single-task dialogue choice, as shown at 660.

As noted above, if one or more chatbots are added to the set of multiple chatbots once the predictive model has already been trained, because the output dimension of the model changes, in embodiments, the model is re-trained to take into account all of the chatbots in the updated set of chatbots. Thus, a feature vector for each training question is derived for each new chatbot, and those feature vectors are then added. Thus, in embodiments, scaling up in chatbot number requires re-training. This includes reassigning the initial weights to the new chatbots for each question to use in the <feature, weights> pairs for each question. Thus, for example, if originally there are two chatbots with weights 0.4, 0.6, respectively, when a new chatbot is added that has an associated weight of 0.8, there are now three chatbots with weights 0.4, 0.6 and 0.8, respectively. After normalizing, the weights are 0.22, 0.33 and 0.45, which preserves the relative importance of each chatbot within the set of chatbots.

Figure 7:
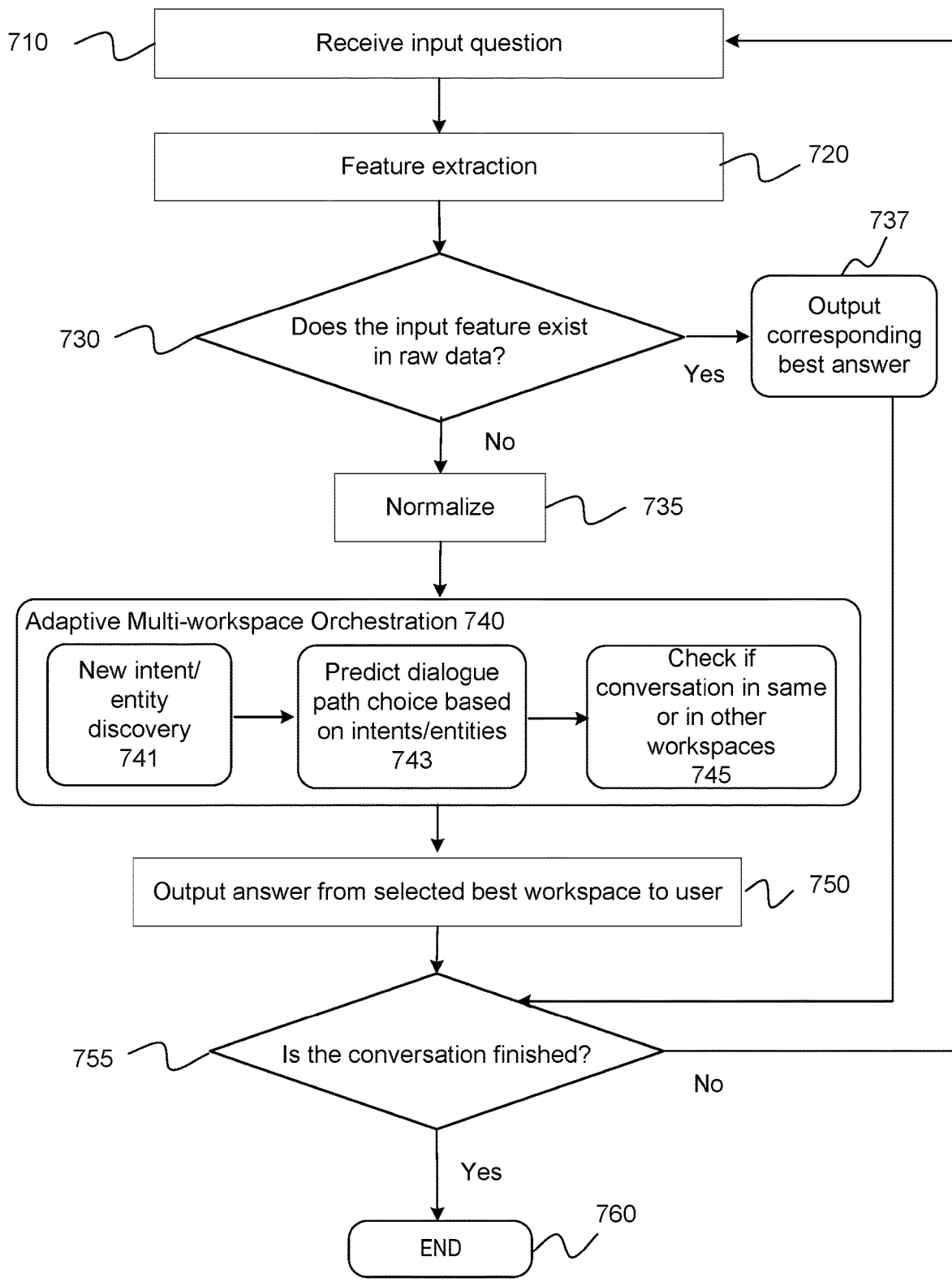
FIG. 7 is a flow chart of an example runtime process, according to one embodiment disclosed herein.

FIG. 7 is a flow chart of an example runtime process 700, according to one embodiment disclosed herein. The blocks of process 700 reflect tasks performed by runtime architecture 156 shown in FIG. 1A. Process 700 includes blocks 710 through 760. In alternate embodiments process 700 may have more, or fewer, blocks.

Continuing with reference to FIG. 7, process 700 begins at block 710, where an input question is received from a user. For example, the user input may be received by a user interface, such as user interface 150 of FIG. 1, for example, and forwarded to a set of chatbots 175, as well as to an adaptive orchestrator 151, as shown in FIG. 1. From block 710, process 700 moves to block 720, where features of the user's input question are extracted, such as an intent and an entity inherent in the user's question. This feature extraction may be performed by a feature extraction component, such as feature extractor 153, of adaptive orchestrator 151, shown in FIG. 1, for example, and it may include these features as parsed by each chatbot in the set of chatbots 175 of FIG. 1, and concatenated into a feature vector 355, as illustrated in FIG. 3, for example. From block 720, process 700 moves to query block 720, where it is determined whether the input feature already exists in raw data. This may be determined by comparison with previous feature vectors stored in the system. For example, if the feature vector that is extracted already exists in a database of feature vectors, for example, that may be stored in memory 159 of adaptive orchestrator 151 of FIG. 1, then that feature vector is simply input to the predictive model, and the corresponding best answer chosen by the predictive model is output to the user. In such case the response to query block 730 is a "Yes" and process 700 moves to block 737, where a corresponding best answer is output to the user, and process 700 then terminates.

It is here noted that, in some embodiments, because the deep learning predictive model may have been updated or retrained since the last time this user input question was asked, whatever prior answer that was provided to the user question is not simply provided to the user at block 737. Rather, an intent/entity parsing of the question is obtained from all of the chatbots, the feature vector formed, and then fed into the predictive model. The chatbot selected by the predictive model is used, and its response provided to the user as the corresponding best answer at block 737. In alternate embodiments, to save processing time, if at query block 730 the feature vector obtained at block 720 is identical to a feature vector obtained from the prior user input, then the prior selected chatbot and its answer are simply output at block 737, without rerunning the deep learning mode on the feature vector. Computationally, this requires only a comparison of the two feature vectors, and not a rerunning of the model on this (identical) feature vector. In such embodiments, the corresponding best answer provided to the user in response to each feature vector is saved in a linked manner to the feature vector, and simply output to user, as described for this alternate embodiment.

From block 737, process 700 moves to query block 755, to determine if the conversation is finished, or if there are further rounds of conversation, and thus additional input questions, still to be responded to.

Continuing with reference to FIG. 7, if, on the other hand, a "No' is returned at query block 730, then process 700 moves to block 735, where normalization is performed, as described above with reference to FIG. 6. This is because the feature vector has new <intent, entity> pairs, and may also include data from a different number of chatbots, then were the case when the model was previously trained, so normalization of the current feature needs to be performed for retraining. From block 735, process 700 moves to block 740, where adaptive multi-task orchestration is performed. For example, in embodiments, adaptive multi-task orchestration may be performed by adaptive orchestrator 151 of the example system of FIG. 1, described above. In block 740, as shown, there are three separate sub-blocks, 741, 743 and 745. Processing begins in sub-block 741, where new intent/entity discovery is done in each chatbot. This reflects the fact that a "No" was returned at query block 730, and thus the parsing of the user's input has now resulted in one or more new intent/entity pairs (and, as noted, there may be a different number of chatbots in the set, as well). In embodiments, the results of the new intent/entity discovery may be concatenated by feature extractor 153, of adaptive orchestrator 151, for example, of FIG. 1.

From sub-block 741, given the new intent and entity discovered, process 700 moves to sub-block 743, where a dialogue path choice is predicted based on the updated set of intents and entities, as shown, for example, in FIGS. 2A and 2B, described above. From sub-block 743, process 700 moves to sub-block 745, where a check is performed to determine if the conversation is in the same chatbot, or in another chatbot of the set of chatbots.] From block 740, process 700 moves to block 750, where the answer to the current input question is output to the user from the workspace selected at block 740. From block 750 process 700 moves to query block 755, where it is determined if the conversation is finished, or if there are more user inputs. As long as the response at query block 750 is "No", process 700 repeats the processing in blocks 710 through 740. Once the conversation is in fact over, and thus a "Yes" is returned at query block 755, process 700 terminates at block 760.

Figure 8:
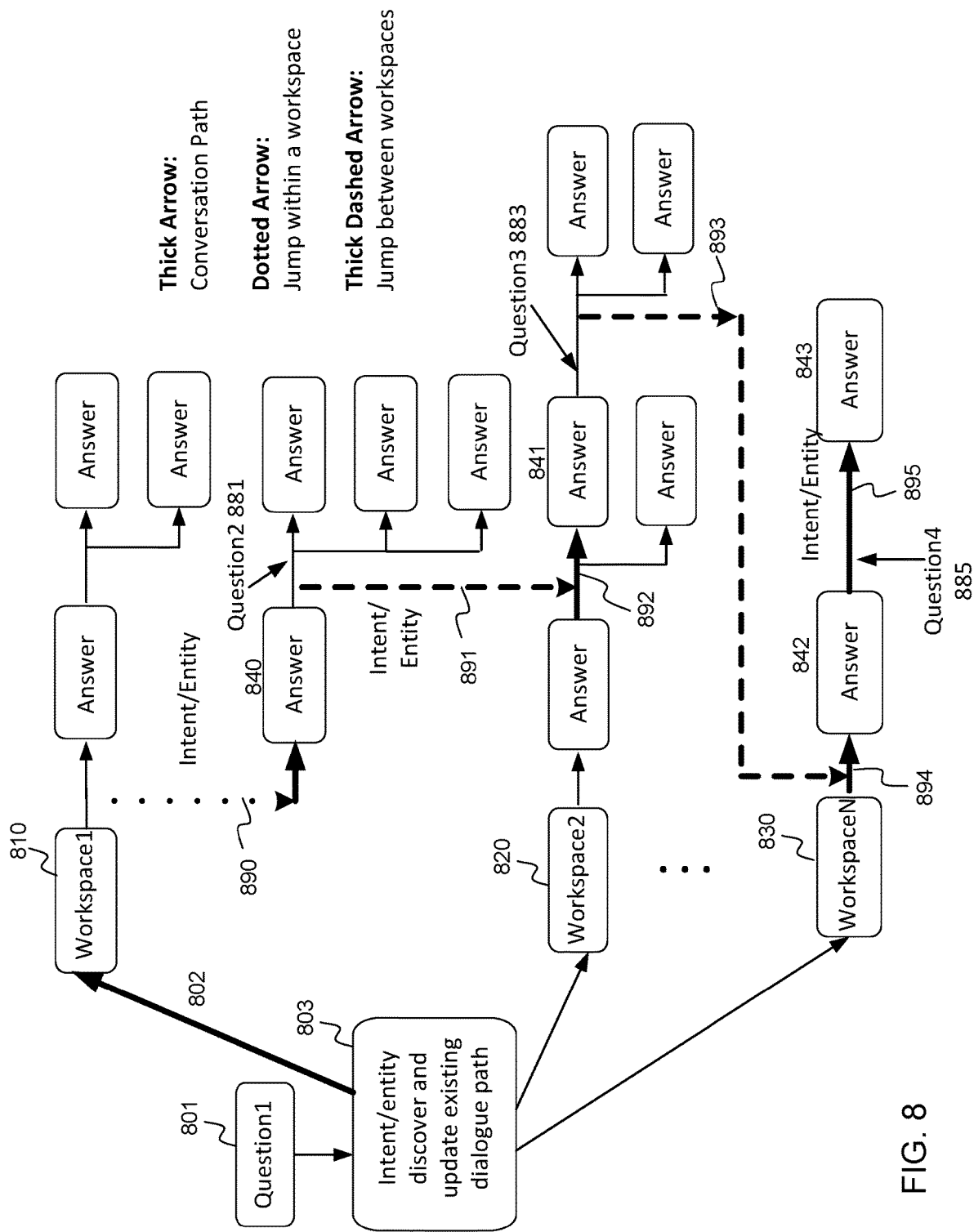
FIG. 8 illustrates an example of adaptive multi-workspace orchestration, according to one embodiment disclosed herein.

FIG. 8 illustrates an example of adaptive multi-workspace orchestration, according to one embodiment disclosed herein. The example shows the path of a conversation that uses answers from each of three separate workspaces. The conversation path is indicated by a thick arrow, and jumps within the same workspace, or between separate workspaces, are shown in dotted or dashed arrows, respectively.

With reference to FIG. 8, at 801 a user's question, Question1, is received by a multi-task dialogue system. In response to the received question, at 803, intent/entity discovery is performed, a feature vector generated for this question from all of the intent/entity values from each of the N chatbots in the system, and an existing dialogue path is updated. Of the N workspaces of the dialogue system, three example workspaces are shown, Workspace1 810, Workspace2 820, and Workspace3 830, as these are the workspaces in which the actual conversation path takes place, in this example. In each workspace there are one or more possible answers to question 801, as well as one or more possible answers to follow-up user questions submitted by the user. In embodiments, in each conversation round orchestration selects the best answer path based on the intents and entities. The path may include dialogue path jumps within a workspace (dotted arrow), or between separate workspaces (dashed arrow).

Continuing with reference to FIG. 8, as shown at 810, Workspace1 is chosen as the best workspace to answer user question 801. Thus, there is a thick line 802 (indicating the actual conversation path) running from block 803 to Workspace1. Within Workspace1 there are two possible answers to Question1 801. The lower answer 840 is chosen by selected Workspace1 as the best response, and the conversation thus jumps along arrow 890, in an intra-workspace jump to the second answer path. Once the answer 840 is provided to the user, a follow up question, Question2 881, is received by the system from the user. The intent and entity of this Question2 881 is parsed, system wide, a feature vector generated, and possible answers considered. Although Workspace1 has three possible answers to Question2 881, orchestration selects a different workspace, Workspace2 820. Given the intent and entity parsing, Workspace2 820 outputs answer 841, the first of its two possible answers. Thus, as shown, the conversation path jumps, along dashed arrow 891 (indicating an inter-workspace path jump) from Workspace1 to the first answer path of Workspace2 820, which is shown by solid thick arrow 892.

Once the answer 841 is provided to the user from Workspace2, a follow up question, Question3 883, is received by the system. The intent and entity of this Question3 883 is parsed, system wide, a feature vector is generated, and all possible answers considered. Although the current workspace, Workspace2, has two possible answers to Question3 883, as shown, orchestration selects a different workspace, WorkspaceN 830, as the best workspace to provide the answer to Question3. WorkspaceN 830 has only one possible answer, Answer 842, to Question3 883, and thus the conversation path jumps, along dashed arrow 893 (indicating an inter-workspace dialogue path jump), from Workspace2 to WorkspaceN, and to the answer path 894.

Continuing with reference to FIG. 8, once the answer 842 is provided to the user, another follow up question, Question4 885, is received by the system. The intent and entity of this Question4 885 is parsed, system wide, a feature vector is generated, and all possible answers considered, all as described above. Orchestration now decides to remain in WorkspaceN as the best chatbot available to respond to Question4 885. Thus the conversation path remains within the current workspace, without any jumps, along solid thick arrow 895 to answer 843 of Workspace3 830. Although the conversation may continue for several more rounds, these are not shown in the example conversation snippet shown in FIG. 8.

FIG. 9 depicts an example output responding to the user question "Where do I add new learning", according to one embodiment disclosed herein. It is noted that this user question was previously used as the example question of FIG. 5, described above. With reference to FIG. 9, the example multi-task dialogue system has four workspaces or chatbots. The example output is provided on a user interface screen of the multi-task dialogue system, which allows a user to enter their question at 901, and then press a start button 903. An example multi-task adaptive orchestration application of the example system then processes the question, and provides the output as shown, in an example array with four rows and three columns, as shown. Column 910 lists the four workspaces.

The four workspaces refers to a set of four chatbots collectively used by an online sales and education platform. These four chatbots are named "Your Learning" 910, "Your Learning Service Center" 920, "Event Central" 930 and "New Seller" 940, and each is designed to provide information to users of the platform. In particular, each of these four chatbots is designed to answer questions and provide guidance to sellers and other providers of educational content, whether in general, or about the goods and services that they may sell.

Continuing with reference to FIG. 9, there are shown two more columns. Column 912 has the weight for each workspace as assigned by the orchestration, and column 913 has the answer or response provided by each respective workspace. As shown, the weights in column 920 add up to 1.0, and are thus normalized, as noted above. Moreover, as shown in bold, it is workspace 920 "Your Learning Service Center" that was assigned the highest weight, 0.939, far above that of any of the other workspaces. Thus the answer shown in column 913, for workspace 920 (shown in bold) is the response provided to the user in this example. It is noted, as is seen in this example, the best response may be much longer than a simple sentence, depending upon the context of the workspace and the user's question.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a cognitive multi-task orchestration operation, according to embodiments of the present disclosure) or related data available in the cloud. For example, the cognitive multi-task orchestration operation could execute on a computing system in the cloud and, in response to user input to a multi-task dialogue system, select one of the single-task dialogue systems included in the multi-task dialogue system to provide the best answer or response to the user input. In such a case, the cognitive multi-task orchestration operation could receive user input from a remote computing node, forward that input to the various single-task dialogue systems it orchestrates, obtain the semantic attributes of the user input as parsed by the various single-task dialogue systems, and generate feature vectors from the semantic attributes. The cognitive multi-task orchestration operation could for example, input the feature vectors to a predictive model, and obtain a best single-task dialogue system to respond to the user input. The cognitive multi-task orchestration operation could further store in a data structure each feature vector generated to each user input, and further store a list of, for example, <intent,

What is claimed is:

1. A method comprising:
receiving a user input to a chat thread of a multi-task dialogue system;
transmitting the user input to each chatbot in a set of chatbots;
receiving, from each respective chatbot in the set of chatbots, a respective intent data and a respective entity data, wherein:
the respective chatbot generates the respective intent data and the respective entity data by processing the user input;
the respective intent data corresponds to a respective intent behind the user input, as determined by the respective chatbot; and
the respective entity data corresponds to a respective entity to which the respective intent refers, as determined by the respective chatbot;
aggregating the respective intent data and the respective entity data received from each respective chatbot in the set of chatbots into a feature vector, wherein the feature vector is a one dimensional vector formed by concatenating the respective intent data and the respective entity data from each respective chatbot into a single vector;
selecting a chatbot, from the set of chatbots, likely to have a best response by processing the feature vector using a predictive model trained to predict the best response;
generating a response to the user input by providing the user input to the selected chatbot; and
outputting the response using the selected chatbot.

2. The method of claim 1, wherein the user input includes a question or a greeting.

3. The method of claim 1, wherein the predictive model is a deep learning model.

4. The method of claim 1, wherein the predictive model is trained using a training set of pairs of features and weights for a set of chatbots, wherein the feature includes intent and entity data, and the weights include a probability score for each respective chatbot in the set of chatbots indicating how likely the respective chatbot is to provide a best answer to the user input to the multi-task dialogue system.

5. The method of claim 4, wherein the training set includes pairs of features and weights for each of a plurality of user input questions to the multi-task dialogue system.

6. The method of claim 5, wherein the feature includes multiple intents and entities for one or more of the chatbots in the set of chatbots, in response to one or more of the user input questions.

7. The method of claim 1, wherein the intent and entity data is obtained from each chatbot in the set of chatbots, and further comprising:
determining if the intent and entity data includes any new pairs of intents and entities.

8. The method of claim 7, further comprising, in a response to a determination that the intent and entity data from each chatbot in the set of chatbots includes one or more new pairs of intents and entities, predicting a dialogue path choice based on the intents and entities.

9. A system, comprising:
a user interface, configured to receive a user input to a chat thread of a multi-task dialogue system and transmit the user input to each chatbot in a set of chatbots; and
an adaptive orchestrator, configured to:
receive, from each respective chatbot in the set of chatbots, a respective intent data and a respective entity data, wherein:
the respective chatbot generates the respective intent data and the respective entity data by processing the user input;
the respective intent data corresponds to a respective intent behind the user input, as determined by the respective chatbot; and
the respective entity data corresponds to a respective entity to which the respective intent refers, as determined by the respective chatbot;
aggregate the respective intent data and the respective entity data received from each respective chatbot in the set of chatbots into a feature vector, wherein the feature vector is a one dimensional vector formed by concatenating the respective intent data and the respective entity data from each respective chatbot into a single vector;
select a chatbot, from the set of chatbots, likely to have a best response by processing the feature vector using a predictive model trained to predict the best response;
generate a response to the user input by providing the user input to the selected chatbot; and
output, via the user interface, the response using the selected chatbot.

10. The system of claim 9, the adaptive orchestrator further comprising a predictive model trainer, configured to train the predictive model to output a best chatbot to respond to a user input given the intent data and entity data associated with the user input respectively generated by the chatbots in the set of chatbots.

11. The system of claim 10, wherein the predictive model trainer uses a training set of pairs of features and weights for a set of chatbots, wherein the feature includes intent and entity data, and the weights include a probability score, for each respective chatbot in the set of chatbots indicating how likely the respective chatbot is to provide a best answer to the user input to the multi-task dialogue system.

12. The system of claim 11, wherein the training set includes pairs of features and weights for each of a plurality of user input questions to the multi-task dialogue system.

13. A computer program product comprising:
a non-transitory computer-readable storage medium having computer-readable program code embodied therewith, the computer-readable program code executable by one or more computer processors to:
receive a user input to a chat thread of a multi-task dialogue system;
transmit the user input to each chatbot in a set of chatbots;
receive, from each respective chatbot in the set of chatbots, a respective intent data and a respective entity data, wherein:
the respective chatbot generates the respective intent data and the respective entity data by processing the user input;

the respective intent data corresponds to a respective intent behind the user input, as determined by the respective chatbot; and the respective entity data corresponds to a respective entity to which the respective intent refers, as determined by the respective chatbot;

aggregate the respective intent data and the respective entity data received from each respective chatbot in the set of chatbots into a feature vector, wherein the feature vector is a one dimensional vector formed by concatenating the respective intent data and the respective entity data from each respective chatbot into a single vector;

select a chatbot, from the set of chatbots, likely to have a best response by processing the feature vector using a predictive model trained to predict the best response;

generate a response to the user input by providing the user input to the selected chatbot; and output the response using the selected chatbot.

14. The computer program product of claim 13, wherein the computer-readable program code is further executable to:

train the predictive model using a training set of pairs of features and weights for a set of chatbots, wherein the feature includes intent and entity data, and the weights include a probability score for each respective chatbot in the set of chatbots indicating how likely that chatbot is to provide a best answer to the user input to the multi-task dialogue system.

15. The computer program product of claim 14, wherein the training set includes pairs of features and weights for each of a plurality of user input questions to the multi-task dialogue system.

* * * * *